US008265256B1

(12) United States Patent
Croak et al.

(10) Patent No.: US 8,265,256 B1
(45) Date of Patent: Sep. 11, 2012

(54) METHOD AND APPARATUS FOR LOCATING AND RESERVING ITEMS VIA A WEB APPLICATION

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 425 days.

(21) Appl. No.: 11/262,628

(22) Filed: Oct. 31, 2005

(51) Int. Cl.
*H04M 7/00* (2006.01)
(52) U.S. Cl. ............... 379/220.01; 370/352; 705/26.1; 705/40; 705/41; 705/42; 709/202; 709/219
(58) Field of Classification Search .................. 705/26, 705/26.1, 40, 41, 42; 379/93.23, 201.01, 379/219, 220.01; 709/202, 219; 370/352
See application file for complete search history.

(56) References Cited

U.S. PATENT DOCUMENTS

| 7,043,521 | B2 * | 5/2006 | Eitel ............................. 709/202 |
| 2003/0033211 | A1 * | 2/2003 | Haines et al. .................... 705/26 |
| 2003/0101102 | A1 * | 5/2003 | Kim .................................. 705/26 |
| 2003/0112931 | A1 * | 6/2003 | Brown et al. .............. 379/93.23 |
| 2004/0243477 | A1 * | 12/2004 | Mathai et al. ................... 705/26 |
| 2005/0097005 | A1 * | 5/2005 | Fargo .............................. 705/26 |
| 2005/0149458 | A1 * | 7/2005 | Eglen et al. .................. 705/400 |
| 2005/0261984 | A1 * | 11/2005 | Hutchison et al. .............. 705/26 |

* cited by examiner

*Primary Examiner* — Khai N Nguyen

(57) ABSTRACT

A method and apparatus for providing a web based service that allows subscribers to specify the particular item they desire to purchase, to input a zip code, and to activate a web based tool to search stores within a specified radius of the specified locales to locate and reserve the item for purchase and pickup are disclosed.

12 Claims, 4 Drawing Sheets

METHOD AND APPARATUS FOR LOCATING AND RESERVING ITEMS VIA A WEB APPLICATION

The present invention relates generally to communication networks and, more particularly, to a method and apparatus for locating and reserving items via a web application in communication networks, e.g., packet networks such as Internet Protocol (IP) networks.

BACKGROUND OF THE INVENTION

Consumers spend an inordinate amount of time searching for commercial goods that conform to their desired specifications. Teenagers, in particular, may know exactly the brand of shoes, the particular color, and the size they want but may be unable to locate it within various shopping locales.

Therefore, a need exists for a method and apparatus for locating and reserving items via a web application in a packet network, e.g., an IP network.

SUMMARY OF THE INVENTION

In one embodiment, the present invention provides a web based service that allows a subscriber to specify the particular item they desire to purchase, input a zip code, and activate a web based tool to search stores within a specified radius of the specified locales to locate and reserve the item for purchase and pickup.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
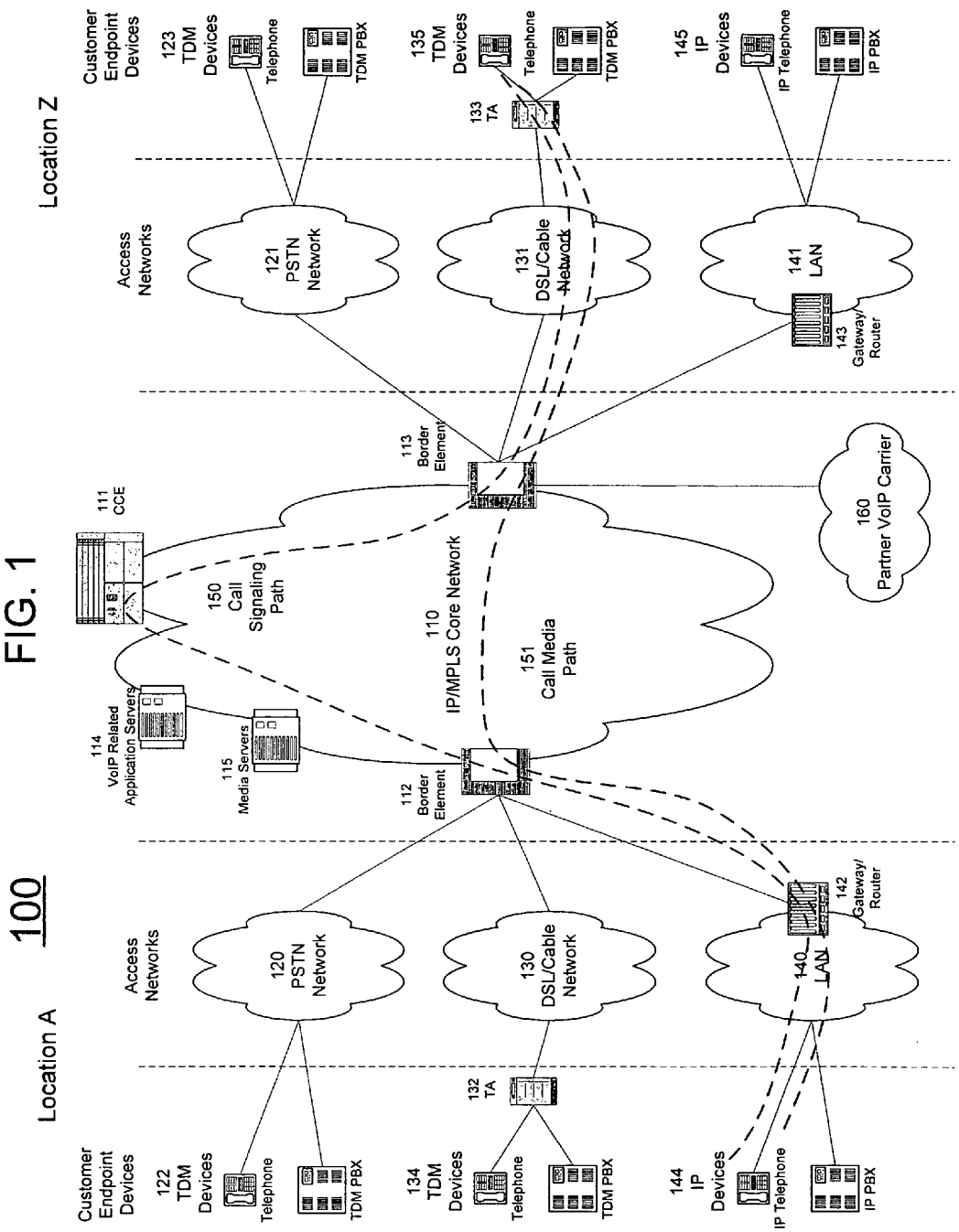
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several-key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
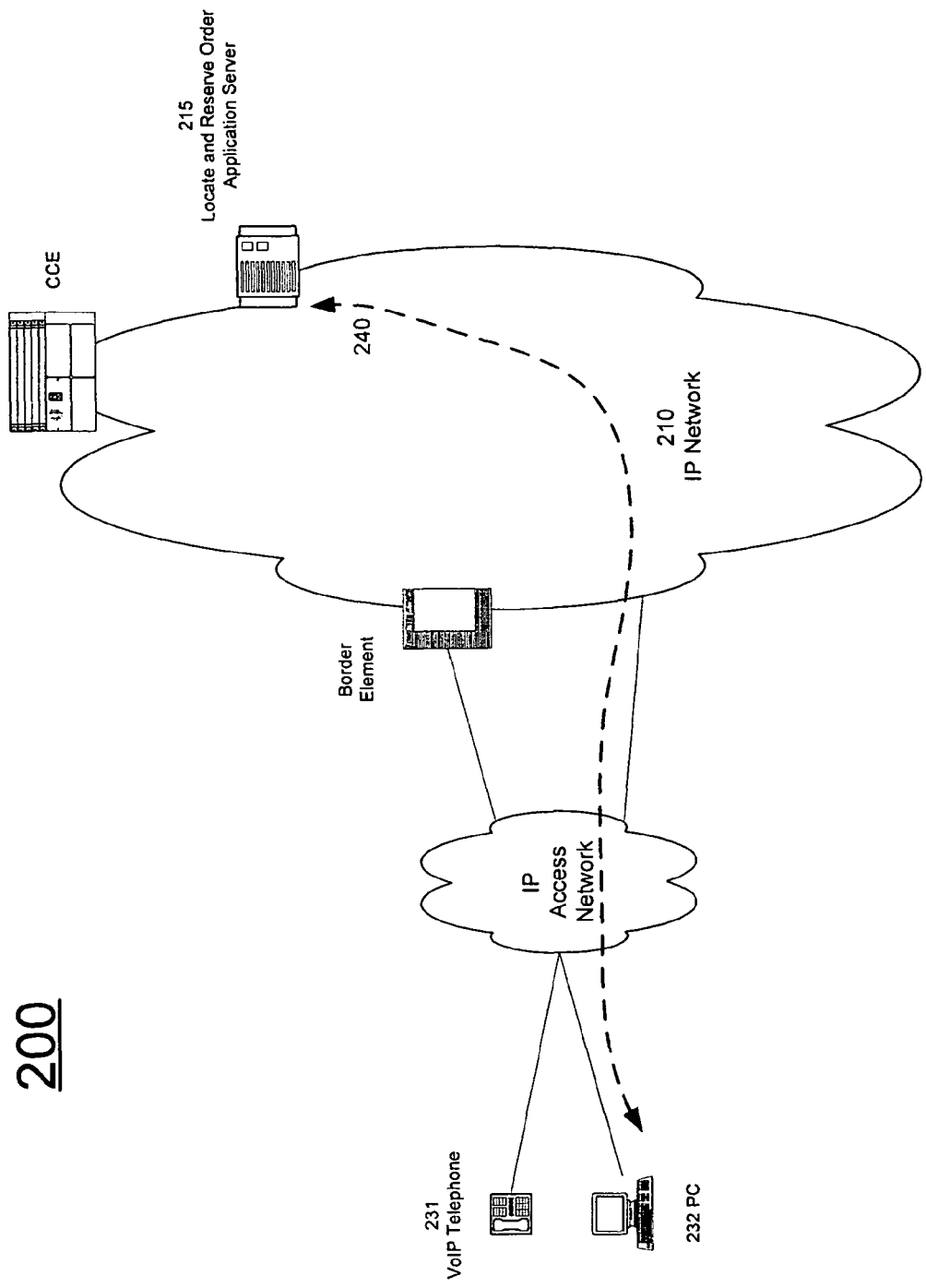
FIG. 2 illustrates an example of locating and reserving order items via a web application in an Internet Protocol (IP) network of the present invention.

FIG. 2 illustrates an example 200 of locating and reserving items via a web application in an Internet Protocol (IP) network of the present invention. In FIG. 2, a subscriber subscribes to both VoIP network services and IP network access services from the provider of IP network 210. IP network 210 provides the backbone network to support VoIP services. The subscriber uses VoIP telephone 231 to access VoIP network services and PC 232 to access IP network services. The subscriber uses PC 232 to access a web based application on Locate and Reserve Order Application Server 215 using flow 240. The subscriber provides the details of an item that the subscriber wants to order but cannot find the item in nearby stores. The subscriber provides the item brand name, model number or name, color choice, and size associated with the item to Locate and Reserve Order Application Server 215. In addition, the subscriber also inputs a zip code and a radius that will be used to define the geographical area in which the order item search is to be performed. Using the provided inputs, Locate and Reserve Order Application Server 215 performs a search for the desired item of the subscriber. Locate and Reserve Order Application Server 215 then sends a list of search results that conforms to the subscriber's specifications to the subscriber for review. Locate and Reserve Order Application Server 215 also offers the subscriber the opportunity to purchase or reserve the item on behalf of the subscriber. The subscriber can provide payment information to Locate and Reserve Order Application Server 215 to purchase or reserve the item at a specific store identified by the search results and to be picked up later. The subscriber can use the subscribed network service account, a credit account, a debit card account, or a prepaid account to purchase or reserve the item. Locate and Reserve Order Application Server 215 then confirms the purchased or reserved order item is ready to be picked up at a specific store location on or after a specified date and time by the subscriber.

Figure 3:
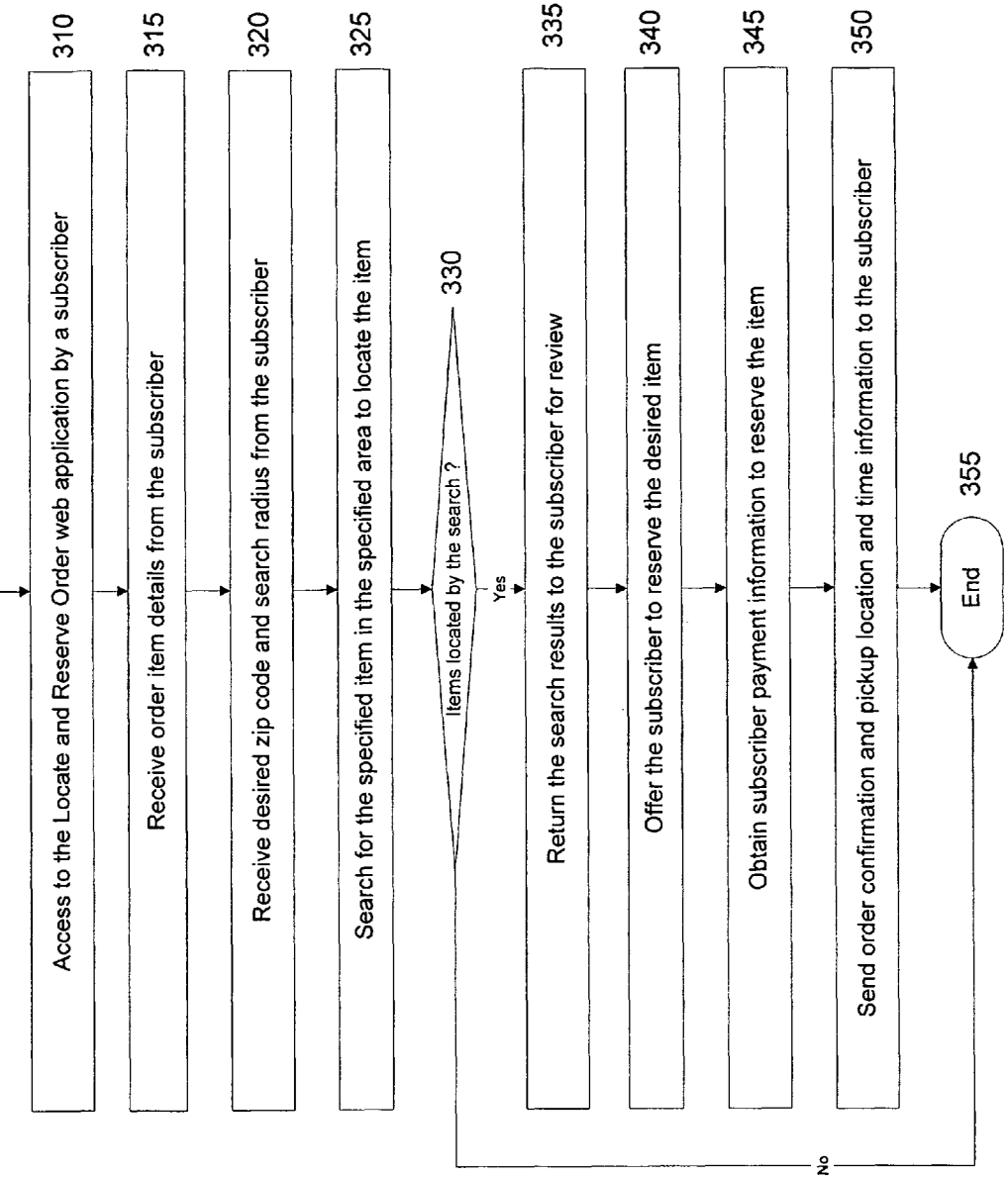
FIG. 3 illustrates a flowchart of a method for locating and reserving order items via a web application in a packet network, e.g., an IP network, of the present invention.

FIG. 3 illustrates a flowchart of a method 300 for locating and reserving items via a web application in a packet network, e.g., an IP network, of the present invention. Method 300 starts in step 305 and proceeds to step 310.

In step 310, the method receives an access request to the Locate and Reserve Order web application by a subscriber. The access request is received by a Locate and Reserve Order Application Server.

In step 315, the method receives the details of the interested item provided by the subscriber. The details are received by the Locate and Reserve Order Application Server. The details of the interested item include, but are not limited to, a brand name, a model number or name, a color choice, a quantity value, a price range that the subscriber is willing to pay, and/or a size associated with the desired item.

In step 320, the method receives the desired geographical search parameters from the subscriber. The received geographical search parameters include, but are not limited to, a zip code and a search radius that will be used as search parameters to conduct the item search. The zip code and the search radius parameters define the geographical search area in which the order item search is to be performed.

In step 325, the method searches the desired item using the item details as well as the geographical search parameters provided by the subscriber to locate the order item for the subscriber. The search is conducted by the Locate and Reserve Order Application Server.

In step 330, the method checks if the desired item has been located by the search. If the desired item has been located, the method proceeds to step 335; otherwise, the method proceeds to step 355.

In step 335, the method returns a list of search results that conforms to the subscriber provided specifications to be reviewed by the subscriber. The list of search results is returned by the Locate and Reserve Order Application Server.

In step 340, the method offers the subscriber an opportunity to reserve or purchase the desired item on behalf of the subscriber. The offer to reserve the desired order item is made by the Locate and Reserve Order Application Server.

In step 345, the method obtains the payment information from the subscriber. The payment information is obtained by the Locate and Reserve Order Application Server. The payment information comprises the method that the subscriber wishes to use to purchase or reserve the desired item. The subscriber can use the subscribed network service account, a credit account, a debit card account, or a prepaid account to purchase or reserve the desired item.

In step 350, the method confirms the purchased or reserved item is ready to be picked up at a specific store location on or after a specified date and time. The confirmation is sent to the subscriber by the Locate and Reserve Order Application Server. The method ends in step 355.

Figure 4:
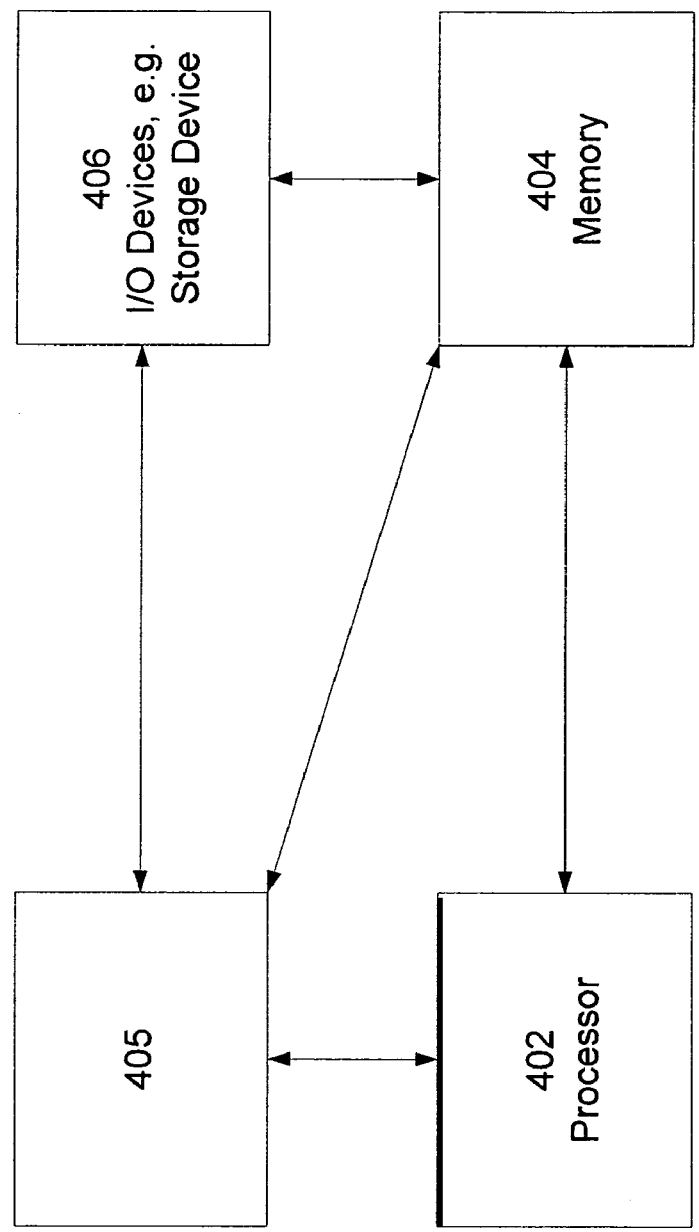
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for locating and reserving order items via a web application, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for locating and reserving order items via a web application can be loaded into memory 404 and executed by processor 402 to implement the functions as discussed above. As such, the present process 405 for locating and reserving order items via a web application (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for locating and reserving items via a web application in a communication network, comprising:
   receiving a search request by a locate and reserve order application server operated by a network provider of the communication network for an item from a subscriber, where the subscriber subscribes to an Internet protocol network access service, from the network provider of the communication network;
   performing the search request for the item to generate a search result;
   forwarding the search result pertaining to the item to the subscriber for review;
   offering the subscriber an offer to purchase or to reserve the item on behalf of the subscriber; and
   purchasing, via the locate and reserve order application server, the item from the search result on behalf of the subscriber if the subscriber accepts the offer to purchase the item from the search result pertaining to the item, wherein a payment method comprises using a network service account of the subscriber, wherein the network service account is for the internet protocol network access service; and
   providing an order confirmation of the item comprising a pickup location.

2. The method of claim 1, wherein the communication network is an internet protocol network.

3. The method of claim 1, wherein the receiving comprises:
   receiving a detail associated with the item; and
   receiving a zip code and a search radius that define a geographic area in which the search request is to be performed.

4. The method of claim 3, wherein the detail comprises at least one of: a brand name, a model number, a model name, a color choice, a size, a quantity or a price range.

5. The method of claim 1, wherein the order confirmation further comprises a pickup time.

6. A non-transitory computer-readable medium having stored thereon a plurality of instructions, the plurality of instructions including instructions which, when executed by a processor, cause the processor to perform a method for locating and reserving items via a web application in a communication network, comprising:
   receiving a search request by a locate and reserve order application server operated by a network provider of the communication network for an item from a subscriber, where the subscriber subscribes to an internet protocol network access service, from the network provider of the communication network;
   performing the search request for the item to generate a search result;
   forwarding the search result pertaining to the item to the subscriber for review;
   offering the subscriber an offer to purchase or to reserve the item on behalf of the subscriber;
   purchasing, via the locate and reserve order application server, the item from the search result on behalf of the subscriber if the subscriber accepts the offer to purchase the item from the search result pertaining to the item, wherein a payment method comprises using a network service account of the subscriber, wherein the network service account is for the Internet protocol network access service; and
   providing an order confirmation of the item comprising a pickup location.

7. The non-transitory computer-readable medium of claim 6, wherein the communication network is an internet protocol network.

8. The non-transitory computer-readable medium of claim 6, wherein the receiving comprises:
   receiving a detail associated with the item; and
   receiving a zip code and a search radius that define a geographic area in which the search request is to be performed.

9. The non-transitory computer-readable medium of claim 8, wherein the detail comprises at least one of: a brand name, a model number, a model name, a color choice, a size, a quantity or a price range.

10. The non-transitory computer-readable medium of claim 6, wherein the order confirmation further comprises a pickup time.

11. An apparatus for locating and reserving items via a web application in a communication network, comprising:
   a locate and reserve order application server operated by a network provider of the communication network configured to:
   receive a search request for an item from a subscriber, where the subscriber subscribes to an internet protocol network access service, from the network provider of the communication network;
   perform the search request for the item to generate a search result;
   forward the search result pertaining to the item to the subscriber for review;
   offer the subscriber an offer to purchase or to reserve the item on behalf of the subscriber;
   purchase the item from the search result on behalf of the subscriber if the subscriber accepts the offer to purchase the item from the search result pertaining to the item, wherein a payment method comprises using a network service account of the subscriber, wherein the network service account is for the internet protocol network access service; and provide an order confirmation of the item comprising a pickup location.

12. The apparatus of claim 11, wherein the communication network is an internet protocol network.

* * * * *